US008686977B2

(12) United States Patent
Park et al.

(10) Patent No.: US 8,686,977 B2
(45) Date of Patent: Apr. 1, 2014

(54) DISPLAY APPARATUS HAVING A TIMING CONTROLLER AND METHOD OF DRIVING THE TIMING CONTROLLER

(75) Inventors: Dong-Won Park, Cheonan-si (KR); Jong-Hyon Park, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 1314 days.

(21) Appl. No.: 11/931,607

(22) Filed: Oct. 31, 2007

(65) Prior Publication Data

US 2008/0122816 A1 May 29, 2008

(30) Foreign Application Priority Data

Nov. 23, 2006 (KR) ........................ 10-2006-0116490

(51) Int. Cl.
*G06F 3/038* (2013.01)

(52) U.S. Cl.
USPC ....... 345/204; 382/232; 382/233; 375/240.03

(58) Field of Classification Search
USPC .............. 345/204, 87; 382/233, 223; 711/162
See application file for complete search history.

(56) References Cited

U.S. PATENT DOCUMENTS

| | | | | |
|---|---|---|---|---|
| 4,439,759 | A * | 3/1984 | Fleming et al. | 345/601 |
| 7,421,552 | B2 * | 9/2008 | Long | 711/162 |
| 2005/0140686 | A1 * | 6/2005 | Kwon | 345/560 |
| 2006/0098879 | A1 * | 5/2006 | Kim et al. | 382/233 |

FOREIGN PATENT DOCUMENTS

| | | |
|---|---|---|
| CN | 1637833 A | 7/2005 |
| JP | 06-205323 | 7/1994 |
| JP | 11-133917 | 5/1999 |
| JP | 2002-229933 | 8/2002 |
| JP | 2005-049840 | 2/2005 |

* cited by examiner

*Primary Examiner* — Grant Sitta
(74) *Attorney, Agent, or Firm* — Innovation Counsel LLP

(57) ABSTRACT

A timing controller is adapted to support a display apparatus that operates with image data having a configuration of M-bits per word and an average serial data flow rate corresponding to CK1 image words per second where CK1 is a first clock frequency and M is a whole number. The timing controller includes a data mapper that converts supplied image data from the M-bits per word times CK1 words per second configuration into a P-bits per word times CK2 words per second configuration so that the mapped data matches the configuration of an external memory. The timing controller also includes a data remapper that performs the inverse conversion. In one embodiment, M is 24 while P is 32.

25 Claims, 8 Drawing Sheets

CK1(80MHz)

| | | | | | | | | | | | | | | | |
|---|---|---|---|---|---|---|---|---|---|---|---|---|---|---|---|
| D0[0] | D1[0] | D2[0] | D3[0] | D4[0] | D5[0] | D6[0] | D7[0] | D8[0] | D9[0] | D10[0] | D11[0] | D12[0] | D13[0] | D14[0] | D15[0] |
| D0[1] | D1[1] | D2[1] | D3[1] | D4[1] | D5[1] | D6[1] | D7[1] | D8[1] | D9[1] | D10[1] | D11[1] | D12[1] | D13[1] | D14[1] | D15[1] |
| D0[2] | D1[2] | D2[2] | D3[2] | D4[2] | D5[2] | D6[2] | D7[2] | D8[2] | D9[2] | D10[2] | D11[2] | D12[2] | D13[2] | D14[2] | D15[2] |
| D0[3] | D1[3] | D2[3] | D3[3] | D4[3] | D5[3] | D6[3] | D7[3] | D8[3] | D9[3] | D10[3] | D11[3] | D12[3] | D13[3] | D14[3] | D15[3] |
| D0[4] | D1[4] | D2[4] | D3[4] | D4[4] | D5[4] | D6[4] | D7[4] | D8[4] | D9[4] | D10[4] | D11[4] | D12[4] | D13[4] | D14[4] | D15[4] |
| D0[5] | D1[5] | D2[5] | D3[5] | D4[5] | D5[5] | D6[5] | D7[5] | D8[5] | D9[5] | D10[5] | D11[5] | D12[5] | D13[5] | D14[5] | D15[5] |
| D0[6] | D1[6] | D2[6] | D3[6] | D4[6] | D5[6] | D6[6] | D7[6] | D8[6] | D9[6] | D10[6] | D11[6] | D12[6] | D13[6] | D14[6] | D15[6] |
| D0[7] | D1[7] | D2[7] | D3[7] | D4[7] | D5[7] | D6[7] | D7[7] | D8[7] | D9[7] | D10[7] | D11[7] | D12[7] | D13[7] | D14[7] | D15[7] |
| D0[8] | D1[8] | D2[8] | D3[8] | D4[8] | D5[8] | D6[8] | D7[8] | D8[8] | D9[8] | D10[8] | D11[8] | D12[8] | D13[8] | D14[8] | D15[8] |
| D0[9] | D1[9] | D2[9] | D3[9] | D4[9] | D5[9] | D6[9] | D7[9] | D8[9] | D9[9] | D10[9] | D11[9] | D12[9] | D13[9] | D14[9] | D15[9] |
| D0[10] | D1[10] | D2[10] | D3[10] | D4[10] | D5[10] | D6[10] | D7[10] | D8[10] | D9[10] | D10[10] | D11[10] | D12[10] | D13[10] | D14[10] | D15[10] |
| D0[11] | D1[11] | D2[11] | D3[11] | D4[11] | D5[11] | D6[11] | D7[11] | D8[11] | D9[11] | D10[11] | D11[11] | D12[11] | D13[11] | D14[11] | D15[11] |

| | | | | | | | | | | | |
|---|---|---|---|---|---|---|---|---|---|---|---|
| D0[0] | D1[0] | D2[0] | D3[0] | D4[0] | D5[0] | D6[0] | D7[0] | D8[0] | D9[0] | D10[0] | D11[0] |
| D0[1] | D1[1] | D2[1] | D3[1] | D4[1] | D5[1] | D6[1] | D7[1] | D8[1] | D9[1] | D10[1] | D11[1] |
| D0[2] | D1[2] | D2[2] | D3[2] | D4[2] | D5[2] | D6[2] | D7[2] | D8[2] | D9[2] | D10[2] | D11[2] |
| D0[3] | D1[3] | D2[3] | D3[3] | D4[3] | D5[3] | D6[3] | D7[3] | D8[3] | D9[3] | D10[3] | D11[3] |
| D0[4] | D1[4] | D2[4] | D3[4] | D4[4] | D5[4] | D6[4] | D7[4] | D8[4] | D9[4] | D10[4] | D11[4] |
| D0[5] | D1[5] | D2[5] | D3[5] | D4[5] | D5[5] | D6[5] | D7[5] | D8[5] | D9[5] | D10[5] | D11[5] |
| D0[6] | D1[6] | D2[6] | D3[6] | D4[6] | D5[6] | D6[6] | D7[6] | D8[6] | D9[6] | D10[6] | D11[6] |
| D0[7] | D1[7] | D2[7] | D3[7] | D4[7] | D5[7] | D6[7] | D7[7] | D8[7] | D9[7] | D10[7] | D11[7] |
| D0[8] | D1[8] | D2[8] | D3[8] | D4[8] | D5[8] | D6[8] | D7[8] | D8[8] | D9[8] | D10[8] | D11[8] |
| D0[9] | D1[9] | D2[9] | D3[9] | D4[9] | D5[9] | D6[9] | D7[9] | D8[9] | D9[9] | D10[9] | D11[9] |
| D0[10] | D1[10] | D2[10] | D3[10] | D4[10] | D5[10] | D6[10] | D7[10] | D8[10] | D9[10] | D10[10] | D11[10] |
| D0[11] | D1[11] | D2[11] | D3[11] | D4[11] | D5[11] | D6[11] | D7[11] | D8[11] | D9[11] | D10[11] | D11[11] |
| D0[12] | D1[12] | D2[12] | D3[12] | D4[12] | D5[12] | D6[12] | D7[12] | D8[12] | D9[12] | D10[12] | D11[12] |
| D0[13] | D1[13] | D2[13] | D3[13] | D4[13] | D5[13] | D6[13] | D7[13] | D8[13] | D9[13] | D10[13] | D11[13] |
| D0[14] | D1[14] | D2[14] | D3[14] | D4[14] | D5[14] | D6[14] | D7[14] | D8[14] | D9[14] | D10[14] | D11[14] |
| D0[15] | D1[15] | D2[15] | D3[15] | D4[15] | D5[15] | D6[15] | D7[15] | D8[15] | D9[15] | D10[15] | D11[15] |

DISPLAY APPARATUS HAVING A TIMING CONTROLLER AND METHOD OF DRIVING THE TIMING CONTROLLER

CROSS-REFERENCE TO RELATED APPLICATION

This application claims priority from and benefit of Korean Patent Application No. 10-2006-116490 filed on Nov. 23, 2006, the disclosure of which is herein incorporated by reference in its entirety.

BACKGROUND

1. Field of Invention

The present disclosure of invention relates to a timing controller and a display apparatus having the same. More particularly, the present disclosure relates to a timing controller capable of reducing consumption of power by a memory unit through which data continuously flows and a display apparatus having the timing controller.

2. Description of Related Technology

In general, a liquid crystal display (LCD) includes two display substrates and a liquid crystal material layer interposed between the two display substrates. The LCD is structured to apply electric fields to the liquid crystal material layer to control the transmittance of light passing through the liquid crystal material layer by adjusting intensity of the electric field in different pixel areas of the LCD, thereby displaying desired images.

Recently, LCD's have found wide usage as display apparatuses in many fields such as in computers, television sets or the like to display moving images. However, a conventional LCD is not suitable for displaying fast moving images since the response speed of the liquid crystal material is often relatively slow.

Each pixel in an LCD may be modeled as including a capacitor formed by a pixel electrode, a common electrode and the liquid crystal material disposed therebetween. A predetermined time is often required in order to charge the liquid crystal capacitor to a desired target voltage with use of that same voltage and to maintain that voltage for sufficient time so as to obtain a desired light transmittance due to the slow response speed of the liquid crystal. Especially, in case that a large voltage difference exists between a previous voltage charged into the liquid crystal capacitor during a previous image frame and the target voltage corresponding to a present frame, the liquid crystal capacitor is often not charged to the target voltage during a 1 H line scanning period even if the target voltage is applied to the liquid crystal capacitor from the beginning of the horizontal line scanning period (1 H period) when the switching element of the pixel is turned on.

Accordingly, in order to speed up the response speed of the liquid crystal, one class of conventional LCD designs employs a dynamic capacitance compensation (DCC) method. According to the DCC method, compensation data voltages rather than target voltages are applied to pixels during a present frame based on a gray scale difference found between a present image data of the given pixel in present frame and a previous image data of the same pixel in a previous frame in order to speed up the response speed of the liquid crystal.

However, additional memories are necessary in the conventional LCD designs employing this DCC method to store the image data corresponding to each frame. In other words, all the image data of a previous frame is flowed into a memory that retains previous frame data in order to allow calculation of the per pixel difference relative to pixel values to be attained in a current frame. The number and size of the memories needed for such retention of old frame data depend on the number of bits per pixel of the image data and the number of pixels per frame. The data throughput speed of the old frame retaining memory depends on the number of bits per frame multiplied by the number of frames displayed per unit of time (i.e., per second). However, in the conventional LCD design, the total number of bits per frame of the image data and the number of bits per discrete pixel (e.g., 24 bits/pixel) generally do not correspond to a standard data bus widths as used in general computing applications (i.e., 16 bits per data port or 32 bits per port or 64 bits per port) and some input parts or output parts of data buses of the memory, if standard sized for general computation use, become redundant (not used). This is especially true if a same DRAM memory bank is used both for computation and display purposes although perhaps not both at the same time.

SUMMARY

The present disclosure of invention provides a timing controller capable of reducing a clock frequency used to write and read per-frame image data into and from an old-frame retaining memory thereby allowing use of a slower, less expensive and less power consuming memory.

The present disclosure also provides a display apparatus having the data processing device, capable of reducing total current consumption and electro magnetic interference (EMI).

In accordance with one aspect of the present disclosure, a timing controller includes a data mapper, a data remapper, and a data compensator.

The data mapper receives a plurality of first image data words having a configuration of M-bits per word in synchronization with a first clock (CK1). The data mapper converts the first image data into a plurality of second image data words having a configuration of P-bits per word, and outputs the second image data words to a external memory of the bandwidth P at a rate defined by a second clock (CK2). The data remapper reads stored ones of the second image data words from the external memory in synchronization with the second clock (CK2), and reconverts read out the second image data words into a third image data words having a configuration of M-bits per word. The data compensator is coupled to the data remapper and operatives to generate compensation for the first image data words based on the reconverted image data words output from the data remapper.

In another aspect of the present disclosure, a display apparatus includes a timing controller, a data driver, a gate driver, and a display panel.

The timing controller generates compensation for first image data words inputted from external device and outputs a data control signal and a gate control signal. The data driver converts the compensation data into a data voltage in response to the data control signal. The gate driver sequentially outputs a gate voltage in response to the gate control signal. The display panel displays an image corresponding to the data voltage in response to the gate voltage.

The timing controller includes a data mapper, a data remapper, and a data compensator.

The data mapper receives a plurality of first image data words having a configuration of M-bits per word in synchronization with a first clock (CK1). The data mapper converts the first image data into a plurality of second image data words having a configuration of P-bits per word, and outputs the second image data words to a external memory of the bandwidth P at a rate defined by a second clock (CK2). The data remapper reads stored ones of the second image data words from the external memory in synchronization with the second clock (CK2), and reconverts read out the second image data words into a third image data words having a configuration of M-bits per word. The data compensator is coupled to the data remapper and operatives to generate compensation for the first image data words based on the reconverted image data words output from the data remapper.

According to the above, the data mapper adjusts the number of bits/pixel of the image data, so that the image data may have the bits/pixel corresponding to the bandwidth of the memory, thereby reducing a clock frequency used to write the image data into the memory or read the image data from the memory, and reducing total power consumption of the display apparatus.

BRIEF DESCRIPTION OF THE DRAWINGS

The above and other advantages of the present disclosure will become readily apparent by reference to the following detailed description when considered is in conjunction with the accompanying drawings wherein.

DETAILED DESCRIPTION

Figure 1:
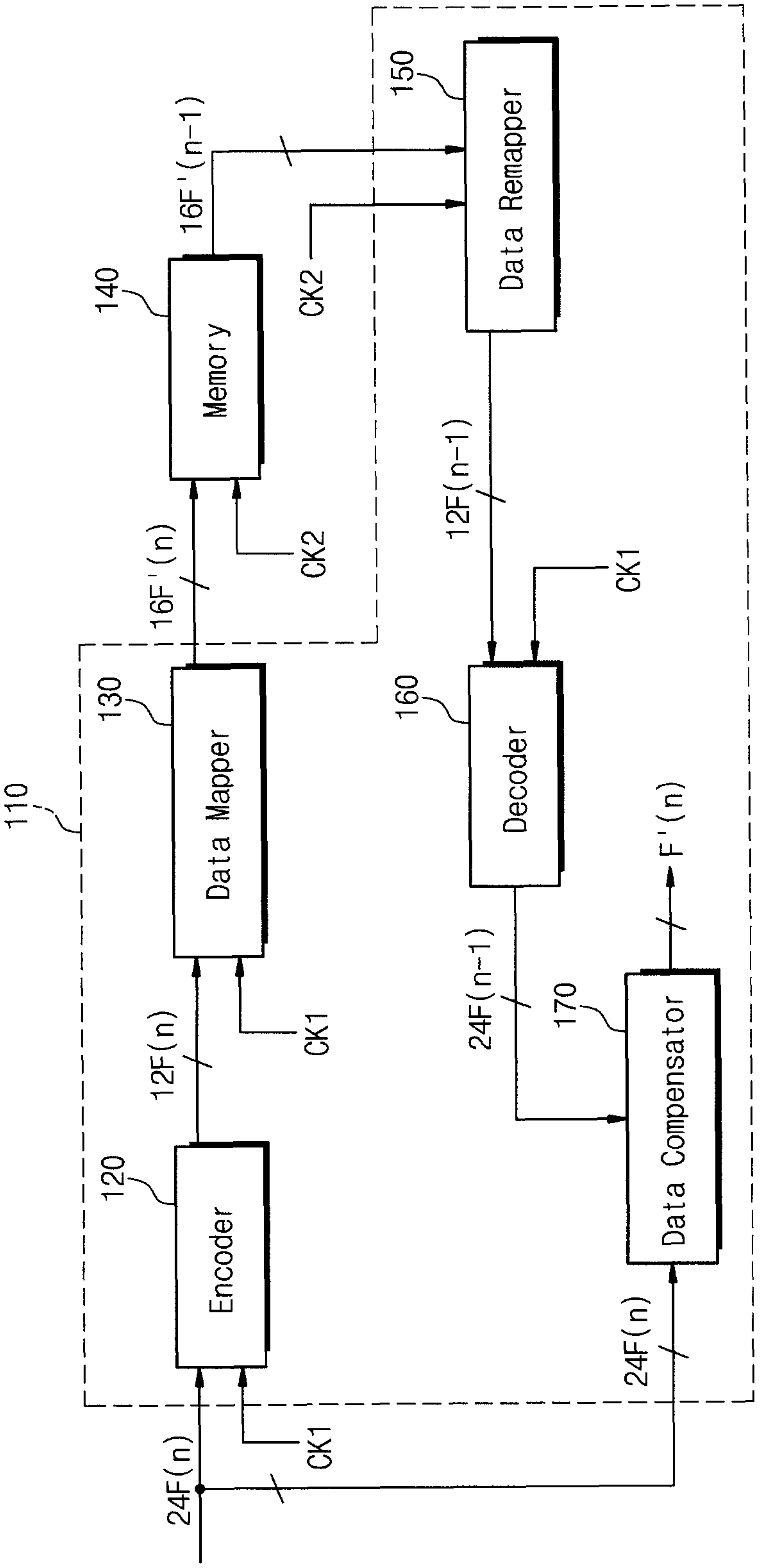
FIG. 1 is a block diagram showing an exemplary embodiment of a timing controller according to the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure most closely pertains. It will be further understood that terms, such as those defined in commonly used dictionaries, should be interpreted as having a meaning that is consistent with their meaning in the context of the relevant technology and will not be interpreted in an idealized or overly formal sense unless expressly so defined herein.

Hereinafter, the present disclosure will be explained in detail with reference to the accompanying drawings.

FIG. 1 is a block diagram showing an exemplary embodiment of a timing controller according to the present disclosure.

Referring to FIG. 1, a timing controller 100 includes an encoder/compressor 120, a data mapper 130, a data remapper 150, a decoder/decompressor 160, and a data compensator 170.

In a present frame whose associated data is denoted as F(n), the encoder 120 receives a plurality of first image data words organized for representing the image as 24 bits per pixel (24b/p) from an external source (not shown) in synchronization with a local first clock CK1 having a corresponding first frequency where the received signal is denoted as 24F(n) to indicate its width in terms of bits per pixel and to indicate the chronology of the frame data as corresponding to a current frame number n (not the same as n used in the $2^n$ notation above). The notation (n−1) is understood to refer to a previous frame. In one embodiment, the received first image data signal 24F(n) includes in each received data word of length 24 bits, a red image data field Rn[7:0], a green image data field Gn[7:0], and a blue image data field Bn[7:0] each consisting of 8 bits.

The encoder 120 compresses the first image data signal 24F(n) of 24 bits/word in half to output a corresponding plurality of second image data denoted as 12F(n) and having 12 bits/word. Although in the described exemplary embodiment, the first image data 24F(n) is compressed to half of its original per-word size by the encoder/compressor 120, in alternate embodiments the first image data 24F(n) may instead be compressed to ⅓ or ¼ or another whole fractional of its original per-word size (i.e., to 8 bits/word, 6 bits/word, 4 bits/word, etc.). One encoding/compression technique that may be used by the encoder 120 is that of limited color palette selection. In one embodiment, 16 specific 8-bit long encodings of predetermined specific Red shades are stored in a Look-Up Table (LUT), say Red0 to Red15. Moreover, 16 specific 8-bit long encodings of predetermined specific Blue shades are stored (Blue0-Blue15) and 16 specific 8-bit long encodings of predetermined specific Green shades are stored (Green0-Green15) in the LUT It requires only 4 bits to specify a unique one of the 8-bit long encodings of Red (Red0 to Red15), 4 bits more to specify a unique one of the 8-bit long encodings of Blue0-Blue15 and 4 further bits to specify a unique one of the 8-bit long encodings of Green0-Green15. Hence 12 bits are sufficient to represent colors of 24 bits/pixel precision if a limited selection palette is acceptable. In one embodiment, the encoder 120 uses the color palette LUT (not shown) to look up the associated 12 bit encodings of the closest R, G, B shades similar to the ones presented on the 24F(n) bus feeding the encoder 120. It is to be understood that the decoder 160 (not yet detailed) will often use the same color palette LUT (not shown) to exactly or approximately recreate the 24 bits/pixel precision that was lost in the encoding process used by the encoder 120.

The data mapper 130 receives the encoded second image data signal 12F(n) from the encoder 120 in synchronism with the first clock CK1. The data mapper 130 converts the second image data signal 12F(n) of 12 encoded bits/word into a third image data signal defined by a plurality of third image data words 16F'(n) of a 16 bits/word configuration. The converted third image data words 16F'(n) are written into an external memory 140 via a data bus of 16 bits width (16 equals $2^n$ where n is 4) in synchronism with the second clock CK2 having a second frequency lower than that of the first clock CK1. In one embodiment, the memory 140 includes an SDRAM (synchronous DRAM) having a bandwidth corresponding to the 16 bits/word and corresponding to the number of bits per frame per unit of time that are used to represent the moving image on the associated LCD display (not shown in FIG. 1, see FIG. 8 instead). In the one exemplary embodiment, the first clock CK1 has the first frequency of about 80 MHz, and the second clock CK2 has the second frequency of about 60 MHz. In other words, the second frequency equals (24/2)/16 times the first frequency of the first clock CK1 where the divide-by-2 operation corresponds to 50% encoding-based compression provided by the encoder 120 and where the divide-by-16 operation corresponds to the mapping of data to 16 bits per word as performed by the data mapper 130. Because of the altered number of bits per word per clock cycle as described above, the second clock CK2 which has a frequency lower than that of the first clock CK1 is applied to the memory 140 when writing the image data into the memory 140, thereby enabling reduction of total power consumption of the timing controller 100 when memory 140 is implemented with a technology such as CMOS whose power consumption increases with increased switching speeds.

Also, since the data mapper 130 converts the second image data signal 12F(n) as flowing at a first throughput rate (CK1) into the third image data signal 16F'(n) which is flowing at a second throughput rate (CK2) to thereby fully match the parallel input width per word of the memory 140 as being equal to $2^n$ bits/word (where n=2, 3, 4, etc.), the third image data 16F(n) may be transmitted to the memory 140 via all data buses of the memory 140 in the case where memory 140 is structured to have data input and data output ports of standardized computational-application width corresponding to $2^n$ bits where n is a whole number, usually greater than 2; e.g., n=4 and then $2^n$=16.

The data mapping process of the data mapper 130 will be described in greater detail with reference to FIGS. 2 and 3.

The data remapper 150 reads out from the memory 140, a plurality of third previous image data signals 16F'(n−1) previously stored in the memory 140 in a previous frame where the read out is in synchronization with the slower second clock CK2. In other words, the third previous image data signals 16F'(n−1) have a data throughput rate matching the second throughput rate (CK2) of the third image data signal 16F'(n) flowing into the memory 140 so that the memory 140 does not generally suffer from either a data overflow or data underflow problem as may occur when input and output throughput rates are different. The data remapper 150 reconverts the third previous image data signals 16F'(n−1) read from the memory 140 into second previous image data signals represented as a plurality of second previous image data words 12F(n−1) with the configuration of 12 bits/word. The remapping operation of the data remapper 150 is the complement of the mapping operation of the data mapper 130 as shall be better understood when FIGS. 2-3 are detailed below. The third previous image data signals 16F'(n−1) flow into the data remapper 150 at the second throughput rate (CK2) to thereby fully match the output rate of the memory 140 The reconverted second previous image data signals 12F(n−1) flow out of the data remapper 150 at the first throughput rate (CK1) and are transmitted as such to the decoder 160 in synchronization with the first clock CK1.

The decoder 160 decompresses the second previous image data signal 12F(N−1) of configuration 12 bits/word into a first previous image data signal configured as a plurality of first previous image data words 24F(n−1) of 24 bits/word organization for example by using the above-described color palette LUT (not shown). The decompressed first previous-frame image data words 24F(n−1) are transmitted to the data compensator 170 which also receives the corresponding current frame data words, 24F(n).

The data compensator 170 generates compensation for the first image data 24F(n) of the current frame based on pixel-by-pixel comparison of the first image data words 24F(n) corresponding to the present frame and the respective first previous image data words 24F(n−1) received from the decoder 160 to thereby output a compensation data signal F'(n) that is to be used in an associated LCD panel (not shown). More specifically, the data compensator 170 is used as part of a dynamic capacitance compensation (DCC) method as mentioned above.

In particular, in one embodiment, the data compensator 170 compares the upper bits (more significant bits) of the first image data 24F(n) with the upper bits (more significant bits) of the first previous image data 24F'(n−1), and generates the compensation data signal F'(n) by adding a looked-up predetermined compensation value to the first image data 24F(n) when a difference value between the upper bits of the first image data 24F(n) and the upper bits of the first previous image data 24F'(n−1) is greater than a predetermined reference value.

The compensation value may be set to a variety of values in accordance with the difference value between the upper bits of the first image data 24F(n) and the upper bits of the first previous image data 24F'(n−1), and is stored in a look-up-table (not shown and not to be confused with the color palette LUT).

In accordance with what is described above, the number of bits of data written per clock cycle (per CK2 cycle) into the memory 140 or read from the memory 140 is expanded (e.g., from 12 bits/word to 16 bits/word) by the data mapper 130 to thereby allow for the reduced words per unit time throughput rate of the memory 140, thereby allowing the same volumetric flow of bits per unit time while reducing the clock frequency (CK2) used to write the image data into the memory 140 and to read the time-delayed image data from the memory 140. Since memory 140 is operating at a slower clock speed (CK2) than that (CK1) used by the LCD system for throughput of image data (24F(n)) and compensation data (F'(n)), the cost of the memory 140 can be reduced relative to that of a higher-speed memory which is capable of operating at the faster clock rate (CK1) and the power consumption of the memory 140 can be reduced as well when the memory 140 is implemented in technology (e.g., CMOS) whose power consumption increases with increased clocking speed.

Although not shown in FIG. 1, the timing controller 100 may be prepared in the form of a monolithic integrated circuit chip, and the encoder 120, the data mapper 130, the data remapper 150, and the decoder 160 may be integrally installed inside the timing controller 100.

Figure 2:
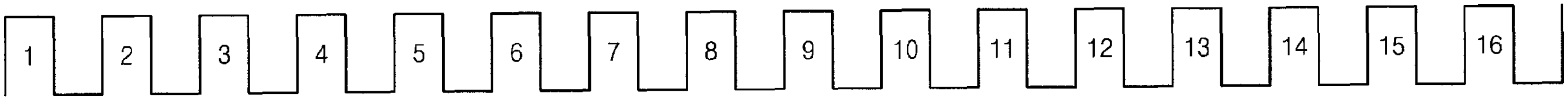
FIG. 2 is a table showing sixteen second image data in FIG. 1.

FIG. 2 is a table showing sixteen samples of second image data in FIG. 1 taken over a corresponding 16 cycles of the faster first clock (CK1). FIG. 3 is a table showing twelve samples of third image data in FIG. 1 taken over a corresponding 12 cycles of the slower second clock (CK2).

Referring to FIG. 2, the sixteen samples of second image data include data words 0 to 15 illustrated as being distributed horizontally (over time) and bits 0 to 11 illustrated as being distributed vertically (within the time span of a given clock cycle) where the totality of bits moved in the 16 clock cycles is denoted as image data words D0[11:0]~D15[11:0] each consisting of 12 bits/dataword.

The totality of 12 times 16 bits (equal 192 bits) of image data D[11:0]~D15[11:0] as shown in the time span of FIG. 2 are transmitted to the data mapper 130 (refer to FIG. 1) in response to the 16 illustrated cycles of the first clock CK1 having the frequency of about 80 MHz. On the other side of the data mapper 130, a totality of 16 times 12 bits (equal 192 bits) of image data D0[15:0]~D11[15:0] as shown in FIG. 3 are transmitted out of the data mapper 130 in the same time span where the time span is now instead covered by the 12 illustrated cycles of the second clock CK2 having the frequency of about 60 MHz. (Note that 16/80 equals 12/60. In other words, the same ratio of bits-per-cycle divided by clock frequency is provided at both input and output of the data mapper 130. Thus the throughput rate in terms of bits per unit time rather than words per unit time is the same.)

Figure 3:
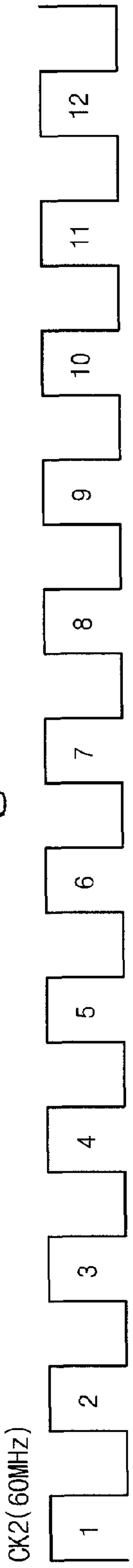
FIG. 3 is a table showing twelve third image data in FIG. 1.

Referring to FIG. 3, the twelve samples of third image data include data words 0 to 11 illustrated as being distributed horizontally (over time) and bits 0 to 15 illustrated as being distributed vertically (within the time span of a given clock cycle) where the totality of bits moved in the 12 clock cycles is denoted as image data words D0[15:0]~D11[15:0] each consisting of 16 bits/dataword.

Therefore, the data mapper 130 may convert the second data or 2-0 to 2-15 image data D0[11:0]~D15[11:0] of 12 bits/word/cycle into the third data or 3-0 to 3-11 image data D0[15:0]~D11[15:0] of 16 bits/word/cycle.

Since columns 0 to 15 of FIG. 2 represent a same time span as columns 0 to 11 of FIG. 3 and both figures illustrate a totality of 192 bits (shown as 12×16 and 16×12), the data mapper 130 can transmit the third data represented by 3-0 to 3-11 image data D0[15:0]~D11[15:0] of FIG. 3 to the memory 140 in response to the second clock CK2 having the frequency of about 60 MHz in the same time span that the data mapper 130 receives the second data represented by 2-0 to 2-15 image data D0[11:0]~D15[11:0] of FIG. 2.

In FIGS. 1 to 3, the timing controller 100 that includes the encoder 120 and the decoder 160 to compress the data of 24 bits/pixel/cycle into the data of 12 bits/word/cycle has been described. The data mapper 130 shown in FIG. 1 may be used convert the second image data 12F(n) of 12 bits/word/short-cycle into the third image data 16F'(n) of 16 bits/word/longer-cycle.

Figure 4:
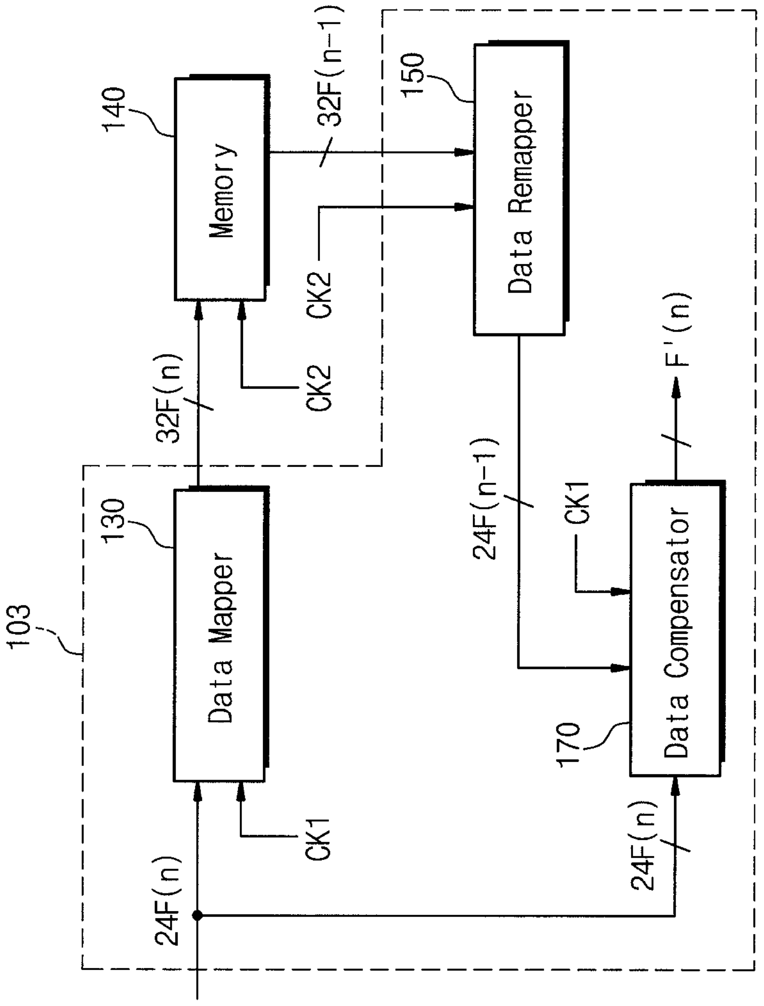
FIG. 4 is a block diagram showing an another exemplary embodiment of a timing controller according to the present disclosure.

Hereinafter, a second embodiment where the timing controller does not include the encoder 120 and the decoder 160 will be described with reference to FIGS. 4 to 7. The memory input and output ports of memory unit 140 in FIG. 4 are 32 bits per word wide. Therefore the transition from the 24 bits/pixel format of input data 24F(n) to the 32F(n) of data output by the data remapper 130 of FIG. 4 constitutes an expansion of bits per word and allows for a corresponding reduction of words per unit time (e.g., number of words the are throughput per discrete number of cycles of the CK1 clock).

In FIG. 4, the same reference numerals denote the same or similar elements in FIG. 1 where practical, and thus the detailed descriptions of the same elements will be omitted. Referring to FIG. 4, the illustrated timing controller 103 includes a 24-to-32 bits/word data mapper 130, a 32-to-24 bits/word data remapper 150, and the data compensator 170.

The data mapper 130 receives the first image data 24F(n) of 24 bits/pixel from an external source in synchronism with the first clock CK1. In one embodiment, the first image data 24F(n) includes the red, green, and blue image data Rn[7:0], Gn[7:0], and Bn[7:0] each consisting of 8 bits. Other formats are of course possible (e.g., 7 bits of blue and 9 bits of red).

The data mapper 130 converts the first image data 24F(n) of 24 bits/word per cycle of fast clock CK1 into a plurality of second image data 32F(n) of 32 bits/word per cycle of slower clock CK2.

In one embodiment, the data mapper 130 converts an input group of thirty-two words of the first image data 24F(n) of 24 bits/word into a mapped output group of twenty-four words of the second image data 32F(n) of 32 bits/word so that the input group (32×24) has the same number of bits as the mapped output group (24×32=768 bits). More specifically, the data mapper 130 causes a first 32 bit data word among the twenty-four output second image data words 32F(n) to be comprised of 24 bits from a first data word of the 24F(n) input set plus 8 more bits from a second data word of the 24F(n) input set; for example the first 24F(n) data word becoming the 24 least significant bits (LSB) of the first thirty-two bit image data word 32F(n) and an 8 bit MSB cutout from the second 24F(n) data word becoming a set of 8 most significant bits (MSB) in the first 32 bit data word. Consequently, with this kind of pattern being repeated, the set of twenty-four second image data words 32F(n) each includes sequentially cutout segments (24 bits plus 8 bits, or 16 bits plus 16 bits or 8 bits plus 24 bits) taken from the set of 32 data words of the first image data 24F(n).

The converted second image data words 32F(n) of 32 bits each are written into an external memory 140 via a data bus of 32 bits width in response to the second clock CK2 having a frequency lower than that of the first clock CK1. In one embodiment, the memory 140 includes a SDRAM having a read and write bandwidth of 32 bits per cycle of CK2. As an example, in one embodiment, the first clock CK1 has a frequency of about 80 MHz, and the second clock CK2 has a frequency of about 60 MHz. In other words, the ratio CK2/CK1 can be as low as 24/32 where the numerator and denominator correspond to the 24 bits/word to 32 bits/word data mapping function performed by the data mapper 130 of FIG. 4. As the above-described, the timing controller 103 may-write the image data into the memory 140 using the second clock CK2 having the frequency lower than that of the first clock CK1, so that the total power consumption of the timing controller 103 may be reduced.

Also, since the data mapper 130 converts the first image data 24F(n) into the width-expanded second image data 32F (n) to allow the second image data 32F(n) to have the number of bits corresponding to a computational system that normally process data with a bandwidth of 32 bits per cycle, the width-expanded second image data 32F(n) may be transmitted to the memory 140 via all data bus lines of the memory 140 without having lines wasted as unused lines in each cycle of clock CK2.

The data remapper 150 reads a plurality of second previous image data 32F(n−1) previously stored in the memory 140 in synchronization with the second clock CK2. The data remapper 150 reconverts the second previous image data 32F(n−1) read from the memory 140 into a plurality of first previous image data 24F(n−1) of 24 bits. The reconverted first previous image data 24F(n−1) which are delayed replicas of the 24F(n) data applied to the data mapper 130 one frame earlier, are transmitted to the data compensator 170 in synchronization with the first clock CK1.

The data compensator 170 compensates the first image data 24F(n) of the present frame based upon the first previous image data 24F(n−1) obtained from the memory 140 to output the compensation data F'(n).

Although in the embodiments of FIGS. 1 to 4, the data mapper 130 are shown to respectively expand the input data of 12 bits/word and first flow rate (CK1) into the wider data of 16 bits/word and second slower flow rate (CK2) or to expand the input data of 24 bits/word and first flow rate (CK1) into the wider data of 32 bits/word and second slower flow rate (CK2), these specific examples are not to be viewed as limiting of the present disclosure. More generally the data mapper 130 may be structured to expand an input image data flow of M bits/word and first flow rate (words/second=CK1) into a mapped outflow of image data of P bits/word and second slower flow rate (words/second=CK2) where P>M; CK1>CK2; and M*CK1 (input bits per second) is generally equal to P*CK2 (mapped outflow in terms of bits per second) although there may be instantaneous burst-like violations of the general requirement (see for example the buffered embodiment of FIG. 5). In one set of embodiments, the mapped outflow of image data of P bits/word and the second slower flow rate (words/second=CK2) is structured to match an I/O bandwidth of a predefined memory device 140 such as one whose input word size (bits per word) is equal to $2^n$ bits/word (where here n=3, 4, 5, 6, etc.) corresponding to the design of a surrounding computer environment (e.g., a computer's SDRAM memory system whose bandwidth can be shared between predefined video throughput requirements and predefined computational throughput requirements. So in this case where $P=2^n$, the second clock CK2 is generally set to a frequency that is the same as $M/2^n$ times the frequency of the first clock CK1 so as to satisfy the general data throughput balancing equation for the data mapper 130 of M*CK1=P*CK2. (In other words, bits per second of input generally equals mapped bits per second of output.)

Figure 5:
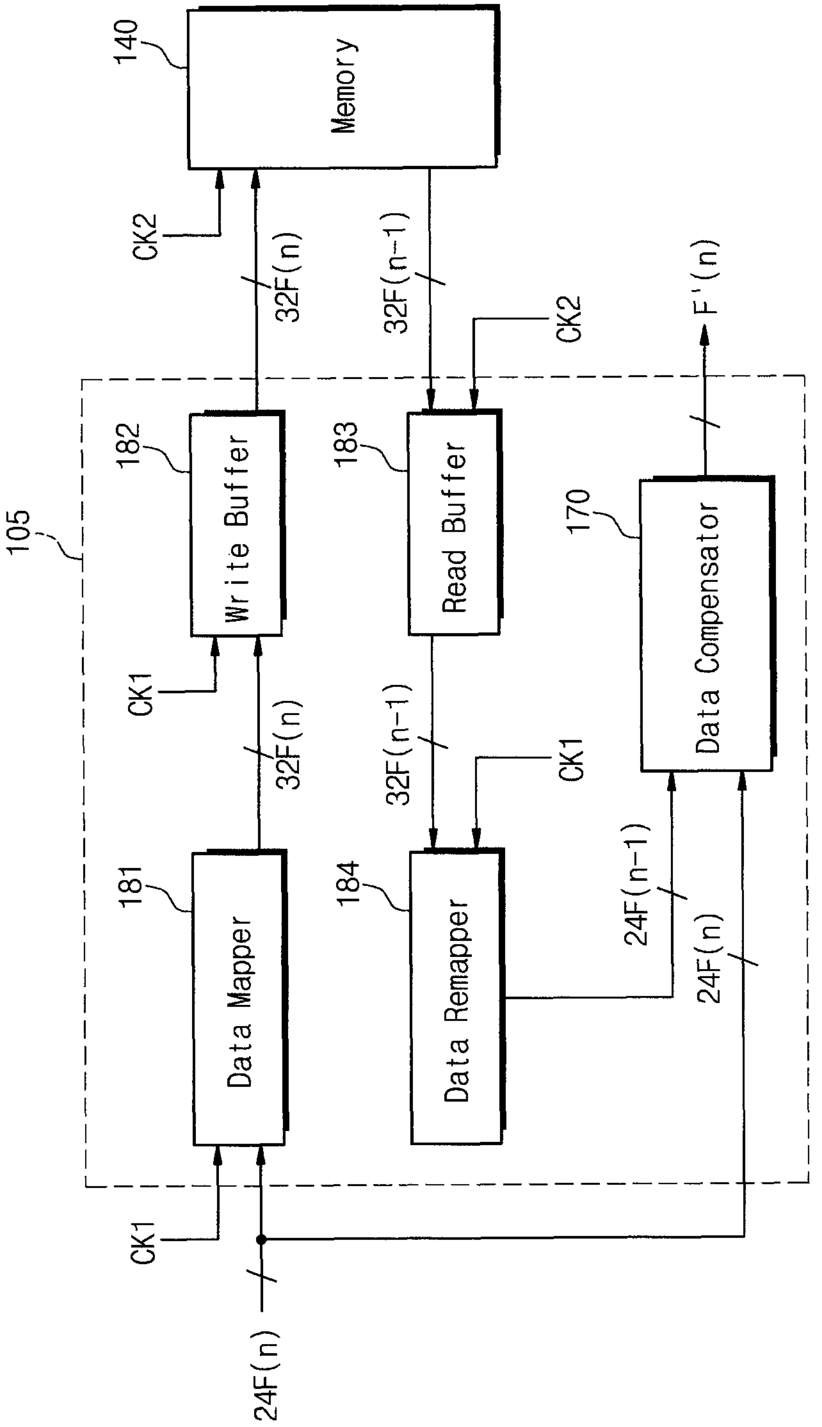
FIG. 5 is a block diagram showing an another exemplary embodiment of a timing controller according to the present disclosure.

FIG. 5 is a block diagram showing another exemplary embodiment of a timing controller including an image data mapping and remapping subsystem and a memory whose bandwidth can be time shared for servicing needs of a compensated display apparatus and of the data processing system. In FIG. 5, the same reference numerals denote the same or similar elements such as those shown in FIG. 1, and thus the detailed descriptions of the same/similar elements will be omitted. Although not fully shown, it is to be understood that the 32F(n) write data input bus of the memory 140 and the 32F(n−1) read data output bus of the memory 140 can be shared on a time multiplexing basis with other subsystems of a subsuming data processing system. As a result of such time-based multiplexing, it appears to the display image subsystem that the memory 140 operates at a relatively slow, effective clock rate of CK2. However the memory 140 and/or its respective write data input bus and read data output bus may in fact operate at substantially higher clock rates.

Referring to details FIG. 5, within the timing controller 105 there includes a data mapper 181, a write buffer 182, a read buffer 183, a data remapper 184, and the data compensator 170. In one embodiment, the timing controller 105 is integrally provided within a monolithic integrated circuit chip so that the data mapper 181, the write buffer 182, the read buffer 183, the data remapper 184, and the data compensator 170 are integrally formed and interconnected as shown within the integrated circuit chip.

The data mapper 181 receives the first image data input flow (24F(n)) from an external image data source (not shown) as 24 bit wide words supplied in synchronism with (and/or at the general rate of) the first clock CK1. The data mapper 181 converts the first image data inflow 24F(n) of 24 bits/word per CK1 cycle into bursts of second image data output flow (32F (n)) in synchronism with the fast CK1 clock. However, the output bursts of the data mapper 181 can be viewed as having a smoothed out average flow rate of 32 bits/word per CK2 cycle where the second effective clock frequency, CK2 is substantially smaller than the first effective clock frequency, CK1. Data flow smoothing is performed by the write buffer 182.

A data mapping process performed by the data mapper 181 will be described shortly with reference to FIG. 6.

Still referring to FIG. 5, the write buffer 182 receives the second image data 32F(n) output from the data mapper 181 in synchronism with (and/or at the general rate on the first clock CK1. As bandwidth opportunities are made available to the write buffer 182 (e.g., FIFO) on the data input bus of an external memory 140, the write buffer 182 writes the second image data 32F(n) into the memory 140 on a first-in, first-out (FIFO) basis in response to the apparent second clock CK2 that has an apparent (effective) the frequency equal to 24/32 times the frequency of the first clock CK1. In the present exemplary embodiment, the memory 140 includes a SDRAM that presents itself to the image processing subsystem as having an effective bandwidth of 32 bits per word and an average word per cycle throughput rate corresponding to the second clock, CK2. As the second image data 32F(n) output from the write buffer 182 has a data width of 32 bits/word matching the bits per word bandwidth of the memory 140, the second image data 32F(n) may be transmitted to the memory 140 via all input data lines of the memory 140 without leaving some input lines unused. As a result, storage capacity in terms of bits per stored word of the memory 140 is fully utilized and the effective clock frequency CK2 of the memory 140 in terms of words per second is fully utilized, thereby minimizing wastage of memory resources.

The read buffer (e.g., FIFO) 183 reads the second previous image data 32F(n−1) corresponding to the previous frame from the memory 140 in response to the second clock CK2. The read buffer 183 transmits the second previous image data 32F(n−1) read from the memory 140 to the data remapper 184 in synchronization with the first clock CK1. In one embodiment, each of the write buffer 182 and read buffer 183 is sized to store at least one display line's worth of data so that data bursts from the data mapper 181 can be transmitted to the write buffer 182 as full display lines and so that read buffer 183 can similarly transmit to remapper 184 data bursts at the CK1 rate corresponding to full display lines.

The data remapper 184 reconverts the second previous image data 32F(n−1) into the first previous image data 24F (n−1) of 24 bits. The reconverted first previous image data 24F(n−1) are transmitted to the data compensator 170 in synchronization with the first clock CK1.

The data remapping process of the data remapper 181 will be described shortly with reference to FIG. 7.

Figure 6:
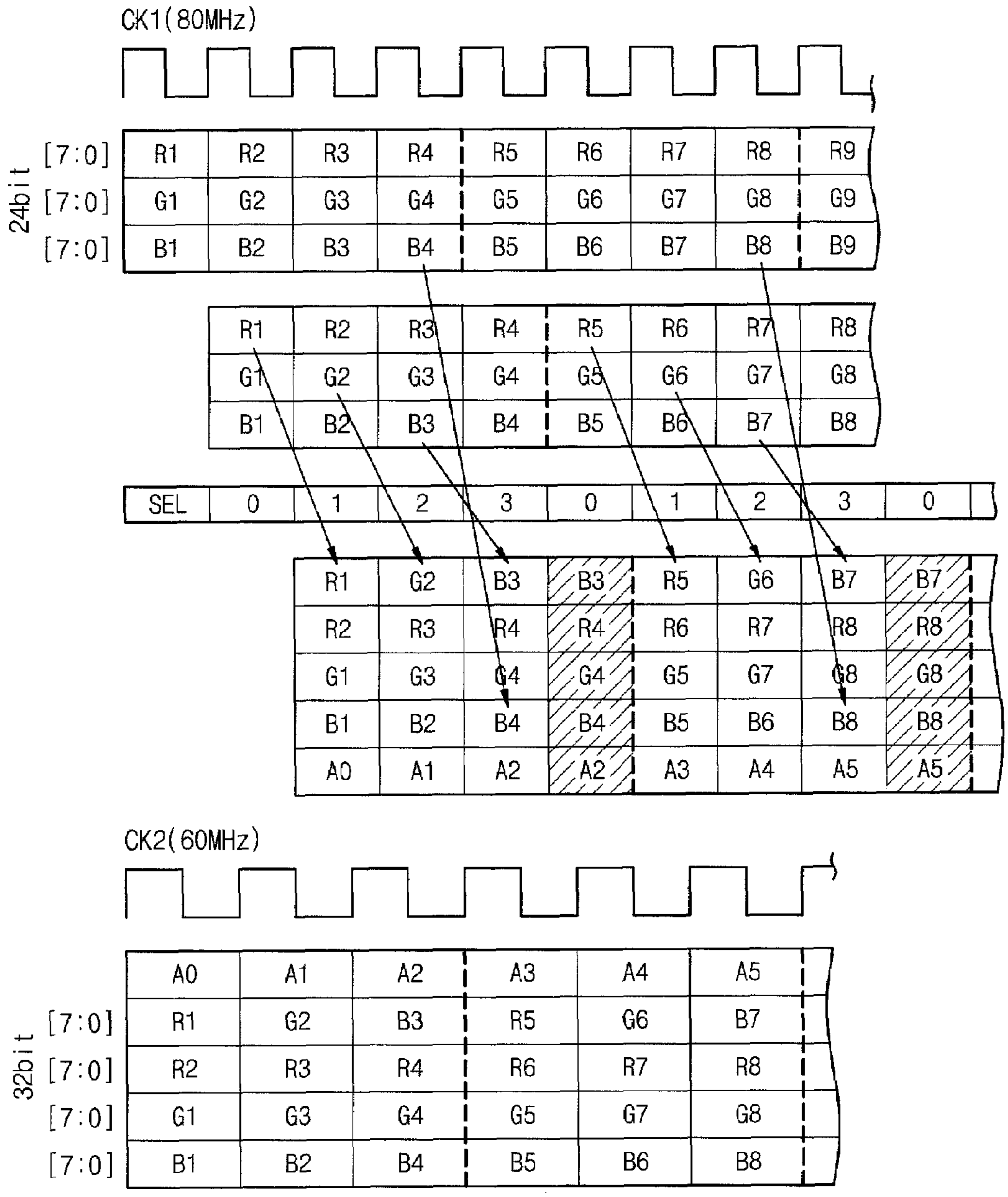
FIG. 6 is a table illustrating a data mapping process of the data mapper shown in FIG. 5.

FIG. 6 is a table illustrating a data mapping process carried out by one embodiment of the data mapping part 181 shown in FIG. 5. FIG. 7 is a table illustrating the data remapping process of the data remapping part 184 shown in FIG. 5.

Referring to FIG. 6, the data mapper 181 (refer also to FIG. 5) receives the first image data 24F(n) of 24 bits/word from the external source in response to the first clock CK1 having the frequency of about 80 MHz. In one embodiment, each of the first image data words 24F(n) includes the red, green, and blue color data fields each consisting of 8 bits. The data mapper 181 sequentially receives a first word (R1,G1,B1) of the first image data 24F(n) at a first rising edge of the first clock CK1, and sequentially receives a second word (R2,G2, B2) of the first image data 24F(n) at a second rising edge of the first clock CK1. In the present exemplary embodiment, the red, green, and blue color data input into the data mapper 181 at the first rising edge of the first clock CK1 (odd numbered edge) are defined as a first group C1 (odd group), and the red, green, and blue color data input into the data mapper 181 at the second rising edge of the first clock CK1 (even numbered edge) are defined as a second group C2 (even group C2).

The data mapper 181 stores four color data fields in an address (e.g., A0) in response to a selecting signal SEL that is repeatedly generated at every four clocks to output the second image data of 32 bits including the four color data fields each consisting of 8 bits. The data mapper 181 writes the second image data into the write buffer 182 in synchronization with the first clock CK1.

More specifically, in one embodiment, the data mapper 181 writes the first red color data R1, the second red color data R2, the first green color data G1, and the first blue color data B1 into a first address A0 of the write buffer 182 at a timing of a first count (1) of the selecting signal SEL. That is, the first red color data R1, the first green color data G1, and the first blue color data B1 written in the first address A0 are selected from the first group C1 (odd clock cycle), and the second red color data R2 written in the first address A0 is selected from the next appearing or second group C2 (even clock cycle).

Then, the data mapper 181 writes the second green color data G2, the third red color data R3, the third green color data G3, and the second blue color data B2 into a second address A1 of the write buffer 182 at a timing of a second count (2) of the selecting signal SEL. Particularly, the second green color data G2 and the second blue color data B2 written in the second address A1 are selected from the second group C2, and the third red color data R3 and the third green color data G3 written in the second address A1 are selected from a third group C3 (odd clock cycle).

The data mapper 181 writes the third blue color data B3, the fourth red color data R4, the fourth green color data G4, and the fourth blue color data B4 in a third address A2 of the write buffer 182 at a timing of a third count (3) of the selecting signal SEL. The third blue color data B3 written in the third address A2 is selected from the odd group (C1), and the fourth red color data R4, the fourth green color data G4, and the fourth blue color data B4 written in the third address A2 are selected from the even group (C2).

The data mapper 181 repeatedly writes the third blue color data B3, the fourth red color data R4, the fourth green color data G4, and the fourth blue color data B4 into the third address A2 of the write buffer 182 at a timing of a fourth count (4) of the selecting signal SEL. Thus, the data mapper 181 may write the second image data expanded to 32 bits into the write buffer 182 in synchronization with the first clock CK1 while not advancing in memory position every fourth clock cycle.

Then, the write buffer 182 stores the second image data of 32 bits stored in each address thereof (A0-A5) into the memory 140 (refer to FIG. 5) in synchronization with the second clock CK2 having the frequency of about 60 MHz. That is, the write buffer 182 transmits the second image data to the memory 140, which have the bits corresponding to the bandwidth of the memory 140, so that the frequency of the writing clock (i.e., the second clock CK2) may be reduced to 24/32 of that of the first clock CK1.

Figure 7:
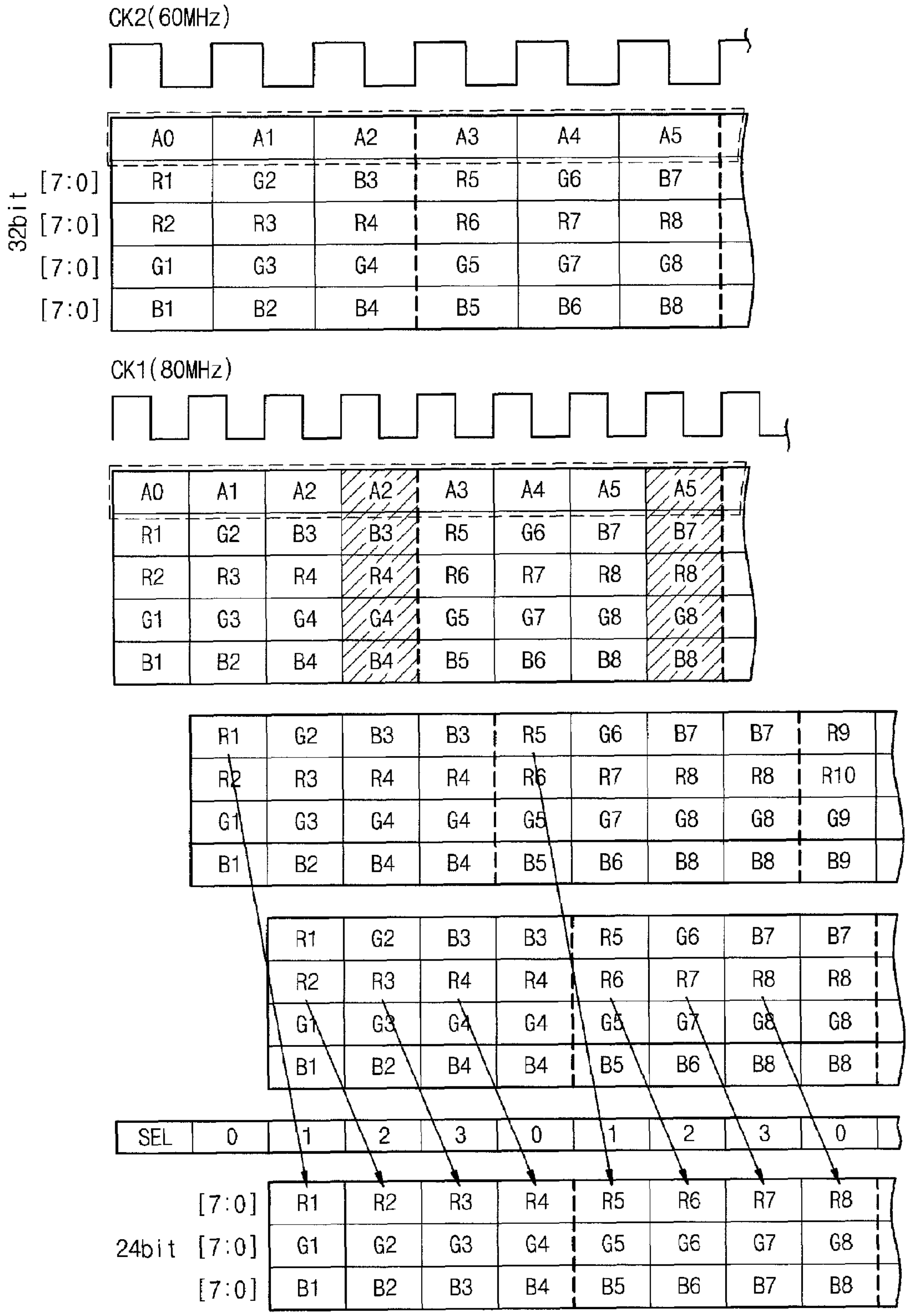
FIG. 7 is a table illustrating a data remapping process of the data remapper shown in FIG. 5.

Referring to FIG. 7, the read buffer 183 (refer to FIG. 5) reads the second image data from the memory 140 in synchronization with the second clock CK2 having the frequency of about 60 MHz.

The data remapper 184 reads the second image data stored in the read buffer 183 in synchronization with the first clock CK1 having the frequency of about 80 MHz. The data remapper 184 twice reads the same color data from the same address at every four clocks of the first clock CK1 without increasing the address.

The data remapper 184 sequentially reads the second image data from the read buffer 183 at the first rising edge of the first clock CK1, and sequentially reads again the second image data from the read buffer 183 at the second rising edge of the first clock CK1. In the present exemplary embodiment, the red, green, and blue color data fields read from the read buffer 183 at the first rising edge of the first clock CK1 are defined here as a third group C3, and the red, green, and blue color data fields read from the read buffer 183 at the second rising edge of the first clock CK1 are defined here as a fourth group C4.

The data remapper 184 reconverts the second image data of 32 bits including four color data fields into the first image data of 24 bits including three color data fields in response to the selecting signal SEL repeatedly generated at every four clocks.

Particularly, the data remapper 184 generates the first image data including the first red color data R1, the first green color data G1, and the first blue color data B1 at the timing of the first count (1) of the selecting signal SEL. The first red color data R1, the first green color data G1, and the first blue color data B1 are selected from the third group C3.

Then, the data remapper 184 generates the first image data including the second red color R2, the second green color data G2, and the second blue color data B2 at the timing of the second count (2) of the selecting signal SEL. The second red color data R2 is selected from the fourth group C4, and the second green color data G2 and the second blue color data B2 are selected from the third group C3.

The data remapper 184 generates the first image data including the third red color data R3, the third green color data G3, and the third blue color data B3 at the timing of the third count (3) of the selecting signal SEL. The third red color data R3 and the third green color data G3 are selected from the fourth group C4, and the third blue color data B3 is selected from the third group C3.

The data remapper 184 generates the first image data including the fourth red color data R4, the fourth green color data G4, and the fourth blue color data B4 at the timing of the fourth count (4) of the selecting signal SEL. The fourth red color data R4, the fourth green color data G4, and the fourth blue color data B4 are selected from the fourth group C4.

As the above-described, the data remapper 184 may reconvert the second image data of 32 bits/word into the first image data of 24 bits/word. Although a specific mapping and remapping operation has been described, various permutations of the basic idea may become apparent to those skilled in the art in light of the foregoing. The present disclosure is therefore not to be seen as limited to the specific algorithm described.

In FIGS. 5 to 7, since the data processing system 105 is provided with the memory 140 including the SDRAM having an apparent bandwidth of 32 bits/word and clock rate CK2 for image processing purposes, the data mapper 181 may convert the first image data of 24 bits/word into the second image data of 32 bits/word. However, the number of bits of the second image data converted by the data mapper 181 may be varied in accordance with the bandwidth of the memory 140.

Figure 8:
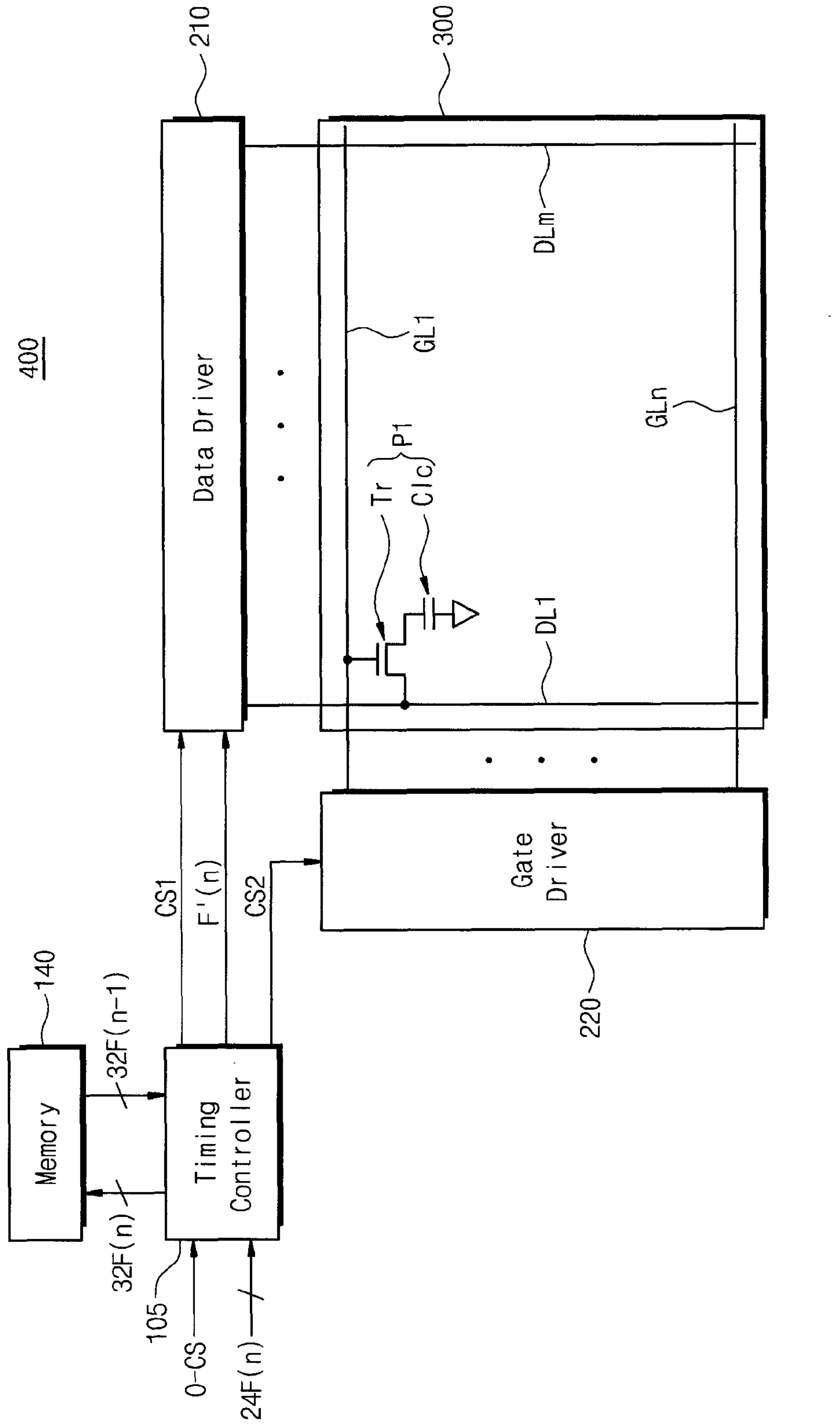
FIG. 8 is a block diagram showing a display apparatus adopting the timing controller in FIG. 5.

FIG. 8 is a block diagram showing a display apparatus adopting the data processing device in FIG. 5. In FIG. 8, the same reference numerals denote the same or similar elements in FIG. 5, and thus the detailed descriptions of the same elements will be omitted.

Referring to FIG. 8, a display apparatus 400 includes the timing controller 105, the memory 140, a data driver 210, a gate driver 220, and a display panel 300.

The timing controller 105 receives a plurality of control signals O-CS and the first image data 24F(n) of 24 bits/word from an external data source (not shown) at the CK1 rate. The timing controller 105 converts the control signal O-CS into a data control signal CS1 and a gate control signal CS2 to transmit the data control signal CS1 and the gate control signal CS2 to the data driver 210 and the gate driver 220, respectively.

Also, the timing controller 105 provides the compensation data F'(n) to the data driver 210 in synchronization with the data control signal CS1. The data driver 210 converts the compensation data F'(n) into a data line drive voltage based on a gamma reference voltage (not shown), and outputs the data voltage in response to an output command signal (not shown). The gate driver 220 sequentially outputs a gate voltage in response to the gate control signal CS2.

The display panel 300 includes a plurality of gate lines GL1~GLn, a plurality of data lines DL1~DLm, and a plurality (array) of pixel units operatively coupled to the gate and data lines. The gate lines GL1~GLn and the data lines DL1~DLm define a plurality of pixel areas in a matrix configuration. The pixel units are arranged in the pixel areas, respectively Each of the pixel units includes a thin film transistor Tr and a liquid crystal capacitor Clc. In the present exemplary embodiment, the thin film transistor Tr of a first pixel P1 includes a gate electrode connected to the first gate line GL1, a source electrode connected to the first data line DL1, and a drain electrode connected to a pixel electrode that serves as a first electrode of the liquid crystal capacitor Clc.

The data lines DL1~DLm receive the data voltage from the data driver 210, and the gate lines GL1~GLn sequentially receive the gate voltage from the gate driver 220. Consequently, the pixels arranged in rows (display lines) are turned on sequentially in response to the gate voltage to receive the data voltage, so that the image corresponding to the data voltage may be displayed.

According to the above, the data mapper adjusts the number of bits of the image data, so that the image data may have the bits corresponding to the bandwidth of the memory, thereby transmitting the image data through all data buses of the memory. Further, the clock frequency used to write the image data into the memory or read the image data from the memory may be reduced from Ck1 to CK2. As a result, the total power consumption of the display apparatus may be reduced.

Although exemplary embodiments of the present disclosure have been described, it is understood that the present disclosure should not be limited to these exemplary embodiments but various changes and modifications can be made by one ordinary skilled in the art within the spirit and scope of the present disclosure after coming to appreciate the present disclosure.

What is claimed is:

1. A timing controller for a display apparatus, the controller comprising:

a data mapper structured and configured to receive, at a first rate that is defined by a first clock (CK1) having a first frequency, a plurality of first image data words having a configuration of M-bits per word, wherein the first image data words are supplied to the data mapper in synchronization with the first clock (CK1), the data mapper being further structured and configured to convert the received first image data words into a corresponding plurality of second image data words having a different configuration of P-bits per word so that the plurality of second image data words match a bandwidth of a prespecified memory, the data mapper being further structured and configured to output the second image data words to the prespecified memory that is structured and configured to input storable data words having the P-bits per word configuration and to store the received second image data words at a rate defined by a second clock (CK2) operating at a second frequency different than the first frequency of the first clock (CK1), wherein a relation between the second frequency and the first frequency depends at least on P; and a data remapper connected, structured, and configured to read from the prespecified memory ones of the second image data words that have been stored in the prespecified memory, wherein reading by the data remapper occurs in synchronization with the second clock (CK2), and wherein the data remapper is further structured and configured to reconvert the second image data words into corresponding third image data words having a configuration of M-bits per word.

2. The timing controller of claim 1, wherein the data mapper is configured to divide a received block of the first image data words into P units and to convert the divided first image data words into M second image data words having said configuration of P-bits per word.

3. The timing controller of claim 1, wherein a condition, M times the first frequency of CK1 equals P times the second frequency of CK2, is maintained for respective frequencies of the first and second clocks so that the number of image bits entering the data mapper per a predefined span of time is equal to the number of image bits output from the data mapper per same span of time.

4. The timing controller of claim 1, wherein P equals a whole power of the number 2.

5. The timing controller of claim 1, wherein the second clock (CK2) has the second frequency that is the same as M/P times the first frequency of the first clock (CK1).

6. The timing controller of claim 1, wherein each of the first image data words comprises a red color data field, a green color data field, and a blue color data field each comprising K-bits, and where M is three times K.

7. The timing controller of claim 6, wherein the data mapper is configured to generate the second image data words of P bits each and each comprising more than just one of each of said red color data field, green color data field and blue color data field.

8. The timing controller of claim 7, further comprising:

a write buffer disposed between the data mapper and the prespecified memory and configured to store the second image data thereinto in synchronization with the first clock; and a read buffer disposed between the prespecified memory and the data remapper and configured to read the second image data from the prespecified memory in synchronization with the second clock.

9. The timing controller of claim 8, wherein the data mapper is configured to sequentially write the second image data words of the P-bits per word configuration in each address of the write buffer in response to a selecting signal, and is configured to repeatedly write a previous second image data word in a previous address at every predetermined number of cycles of the first clock.

10. The timing controller of claim 8, wherein the data remapper is configured to sequentially read the second image data words of the P-bits per word configuration from each address of the read buffer in response to a selecting signal, and to repeatedly read a previous second image data word from a previous address at predetermined number of cycles of the first clock.

11. The timing controller of claim 8, wherein the second image data words stored in the write buffer are read from the write buffer in synchronization with the second clock and stored into the prespecified memory, and the read buffer reads the second image data words from the prespecified memory in synchronization with the second clock but supplies the second image data to the data remapper in synchronization with the first clock.

12. The timing controller of claim 11, wherein the second clock has the second frequency that is equal to a predetermined ratio multiplied by the first frequency of the first clock, and the predetermined ratio has whole numbers as its numerator and denominator.

13. The timing controller of claim 1, further comprising a data compensator coupled to the data remapper and operative to generate compensation for the first image data words based on the reconverted image data words output from the data remapper.

14. A display apparatus comprising:

a timing controller configured to generate compensation for first image data words inputted from an external device and to output a data control signal and a gate control signal;

a data driver configured to convert the compensation data into a data voltage in response to the data control signal;

a gate driver configured to sequentially output a gate voltage in response to the gate control signal; and a display panel configured to display an image corresponding to the data voltage in response to the gate voltage, the timing controller comprising:

a data mapper structured and configured to receive, at a first rate that is defined by a first clock (CK1), a plurality of first image data words having a configuration of M-bits per word, wherein the first image data words are supplied to the data mapper in synchronization with the first clock (CK1), the data mapper being further structured and configured to convert the received first image data words into a corresponding plurality of second image data words having a different configuration of P-bits per word so that the plurality of second image data words match a bandwidth of a prespecified memory, the data mapper being further structured and configured to output the second image data words to the prespecified memory that includes a dynamic random-access memory (DRAM) and is structured and configured to input storable data words having the P-bits per word configuration and to store the received second image data words at a rate defined by a second clock (CK2) operating at a frequency different than that of the first clock (CK1); and a data remapper connected, structured and configured to read from the prespecified memory, ones of the second image data words that have been stored in the prespecified memory, wherein reading by the data remapper occurs in synchronization with the second clock (CK2), and wherein the data remapper is further structured and configured to reconvert the read out second image data words into corresponding third image data words having a configuration of M-bits per word; and a data compensator coupled to the data remapper and operative to generate compensation for the first image data words based on the reconverted image data words output from the data remapper.

15. The display apparatus of claim 14, wherein the data mapper is configured to divide a received block of the first image data words into P units and to convert the divided first image data words into M second image data words having said configuration of P-bits per word.

16. The display apparatus of claim 15, wherein a general condition, namely, M times CK1 equals P times CK2 is maintained for respective frequencies CK1 and CK2 of the first and second clocks so that the number of image bits entering the data mapper per a predefined span of time is generally equal to the number of image bits output from the data mapper per same span of time.

17. The display apparatus of claim 16, wherein P equals a whole power of the number 2.

18. The display apparatus of claim 17, wherein the second clock (CK2) has a frequency that is the same as M/P times the frequency of the first clock (CK1).

19. The display apparatus of claim 14, wherein each of the first image data words comprises a red color data field, a green color data field, and a blue color data field each comprising K-bits, and where M is three times K.

20. The display apparatus of claim 19, wherein the data mapper generates the second image data words of P bits each and each comprising more than just one of each of said red color data field, green color data field and blue color data field.

21. A method of driving a timing controller, the method comprising:

receiving a plurality of first image data words having a configuration of M-bits per word in synchronization with a first clock (CK1) having a first frequency;

converting the first image data into a plurality of second image data words having a configuration of P-bits per word;

outputting the second image data words to an external memory having a bandwidth of P bits per word at a rate defined by a second clock (CK2) having a second frequency, a relation between the second frequency and the first frequency depending at least on P;

reading stored ones of the second image data words from the external memory in synchronization with the second clock;

reconverting read out the second image data words into a plurality of third image data words having a configuration of M-bits per word; and compensating the first image data words based on the third image data words, wherein the plurality of second image data words match the bandwidth of the external memory.

22. The method of claim 21, wherein the first image data words is divided into P units, and the divided first image data words is converted into M second image data words having a configuration of P-bits per word.

23. The method of claim 22, wherein P equals a whole power of the number 2.

24. The method of claim 23, wherein the second clock (CK2) has the second frequency that is the same as M/P times the first frequency of the first clock (CK1).

25. The method of claim 24, wherein each of the first image data words comprises a red color data field, a green color data field, and a blue color data field each comprising K-bits, and where M is three times K.

* * * * *